United States Patent
Toomey et al.

(10) Patent No.: US 9,302,579 B2
(45) Date of Patent: Apr. 5, 2016

(54) FLUSH MOUNTED TRACTOR EXHAUST OUTLET

(71) Applicant: DEERE & COMPANY, Moline, IL (US)

(72) Inventors: Nicholas M Toomey, Evans, GA (US); Prakash Sahoo, Bhubaneswar (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/282,560

(22) Filed: May 20, 2014

(65) Prior Publication Data

US 2015/0336456 A1 Nov. 26, 2015

(51) Int. Cl.
*B60K 13/04* (2006.01)

(52) U.S. Cl.
CPC ..................... *B60K 13/04* (2013.01)

(58) Field of Classification Search
CPC ........ B60K 13/00; B60K 13/04; B60K 13/06; B62D 25/08; B62D 25/082; B62D 25/085; B62D 25/10; F01N 3/00; F01N 3/02; F01N 3/046; F01N 3/05; F01N 3/055; F01N 13/08; F01N 13/082; F01N 13/20; F01N 13/1805; F01N 13/1822; F01N 13/141; F01N 13/143; F01N 1/14; F01N 2270/00; F01N 2270/02; F01N 2270/08; F01N 2340/04
USPC ................ 180/309, 296, 89.2, 69.2
See application file for complete search history.

(56) References Cited

U.S. PATENT DOCUMENTS

| | | | | |
|---|---|---|---|---|
| 3,910,041 | A * | 10/1975 | Gibson | 60/280 |
| 4,011,849 | A * | 3/1977 | Latham | 123/198 E |
| 4,086,976 | A * | 5/1978 | Holm et al. | 180/68.1 |
| 4,133,547 | A | 1/1979 | Fox | |
| 4,308,930 | A * | 1/1982 | Iida et al. | 180/89.2 |
| 4,338,890 | A | 7/1982 | Shelby et al. | |
| 4,341,277 | A * | 7/1982 | Adamson et al. | 180/68.1 |
| 4,388,804 | A | 6/1983 | Bushmeyer | |
| 4,471,853 | A | 9/1984 | Callaghan et al. | |
| 4,506,749 | A | 3/1985 | Sieren | |
| 4,638,632 | A * | 1/1987 | Wulf et al. | 60/319 |
| 4,872,308 | A * | 10/1989 | Nagai et al. | 60/316 |
| 4,993,314 | A | 2/1991 | Braden et al. | |
| 6,068,675 | A * | 5/2000 | Tsuda et al. | 55/385.3 |
| 6,167,976 | B1 * | 1/2001 | O'Neill et al. | 180/69.2 |
| 6,491,133 | B2 * | 12/2002 | Yamada et al. | 181/200 |
| 6,655,486 | B2 * | 12/2003 | Oshikawa et al. | 180/68.1 |
| 7,207,172 | B2 * | 4/2007 | Willix et al. | 60/317 |
| 7,758,680 | B2 * | 7/2010 | Oka et al. | 96/416 |
| 7,779,961 | B2 * | 8/2010 | Matte | 181/227 |

(Continued)

FOREIGN PATENT DOCUMENTS

| | | |
|---|---|---|
| DE | 10258250 A1 | 7/2004 |
| DE | 102011114709 A1 | 4/2013 |

(Continued)

OTHER PUBLICATIONS

German Search Report issued in counterpart application No. 102015208352.7, dated Feb. 10, 2015 (10 pages).

*Primary Examiner* — James M Dolak

(57) ABSTRACT

A flush mounted tractor exhaust outlet includes a plastic tractor hood panel sandwiched between an outlet ring and a support plate. Spacers are provided between the outlet ring and the support plate. An air passage is provided between the support plate and an outlet plate that does not contact the plastic tractor hood panel.

10 Claims, 3 Drawing Sheets

(56) References Cited

U.S. PATENT DOCUMENTS

| | | | |
|---|---|---|---|
| 8,286,422 B2 * | 10/2012 | Yang et al. | 60/317 |
| 8,353,093 B2 | 1/2013 | Stewart et al. | |
| 8,745,976 B2 * | 6/2014 | Ochsner et al. | 60/319 |
| 8,931,266 B2 * | 1/2015 | Uchida | 60/319 |
| 9,027,676 B2 * | 5/2015 | Nakashima et al. | 180/9.1 |
| 9,096,121 B2 * | 8/2015 | Braun | |
| 9,115,632 B2 * | 8/2015 | Wolfcarius et al. | |
| 2008/0115989 A1 | 5/2008 | Matte et al. | |
| 2012/0186894 A1 * | 7/2012 | Schmidt et al. | 180/309 |

FOREIGN PATENT DOCUMENTS

| | | |
|---|---|---|
| EP | 0900715 B1 | 7/2002 |
| JP | H11217848 A | 8/1999 |
| JP | 2000045768 A | 2/2000 |
| JP | 2005256794 A | 9/2005 |

\* cited by examiner

FLUSH MOUNTED TRACTOR EXHAUST OUTLET

FIELD OF THE INVENTION

This invention relates generally to tractor exhaust systems, and specifically to a flush mounted tractor exhaust outlet.

BACKGROUND OF THE INVENTION

Small and/or compact tractors with internal combustion engines have commonly used exhaust systems with downwardly directed exhaust pipes for many applications. Downwardly directed exhaust pipes direct exhaust below the internal combustion engine and are preferred for small and/or compact tractor applications such as mowing, road transport, general field work and work inside buildings. Upwardly directed exhaust pipes direct exhaust up above the engine and are more suited for other applications such as loader work, snow blowing, working in vegetable fields or on sensitive turf grass, working near livestock, or stationary applications including running an aeration pump or grain auger. For example, upwardly directed exhaust pipes on tractors may extend vertically up above a tractor hood to route hot exhaust away from the tractor.

Recently, efforts to reduce emissions including Tier 4 regulations have resulted in small and/or compact tractors having diesel particulate filters (DPFs) or other emissions reduction devices or exhaust treatment devices. Additionally, an upwardly directed exhaust pipe extending vertically above a tractor hood may be undesirable for a number of reasons. For example, an exhaust pipe projecting up through a tractor hood may increase the tractor's height and vertical clearance, and detract from the tractor's general appearance.

In the past, flush mounted tractor exhaust outlets have been proposed. However, flush mounted tractor exhaust outlets may not provide adequate heat shielding for surrounding thermoplastic, painted metal or other composite panels of the tractor hood, resulting in heat damage or melting of the panels and/or damage to the painted structure. Additionally, flush mounted tractor exhaust outlets through body panels have provided little or no protection against debris entry.

A flush mounted tractor exhaust outlet is needed that provides heat shielding for thermoplastic, painted metal or composite panels of a tractor hood, reducing or preventing heat damage or melting of the panels. A flush mounted tractor exhaust outlet also is needed that protects against debris entry.

SUMMARY OF THE INVENTION

A flush mounted tractor exhaust outlet includes an outlet plate having a flange and a neck extending upwardly to a central opening in a tractor hood panel without contacting the tractor hood panel. A support plate has a flange and a neck extending upwardly radially outside the neck of the outlet plate. The support plate is attached to the outlet plate and has spacers between the outlet plate and the support plate to provide an air passage therebetween. An outlet ring having a central opening is positioned on the tractor hood panel and sandwiches the tractor hood panel between the support plate and the outlet ring. The flush mounted tractor exhaust outlet provides heat shielding for thermoplastic, painted metal or composite panels of a tractor hood, reducing or preventing heat damage or melting of the panels. The flush mounted tractor exhaust outlet also protects against debris entry.

DESCRIPTION OF THE PREFERRED EMBODIMENT

Figure 1:
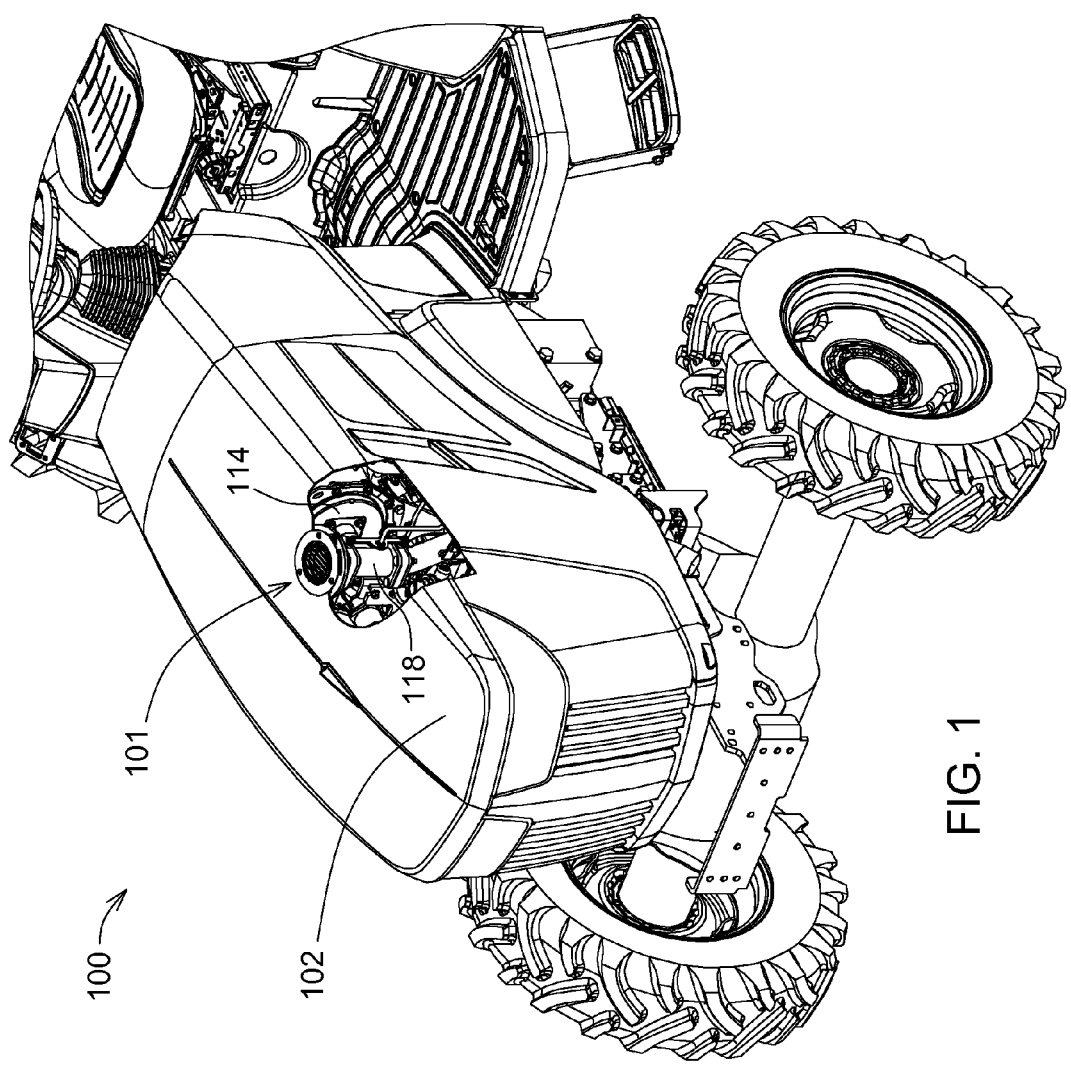
FIG. 1 is a perspective view of a small and/or compact tractor with a flush mounted tractor exhaust outlet according to one embodiment of the invention.
Figure 2:
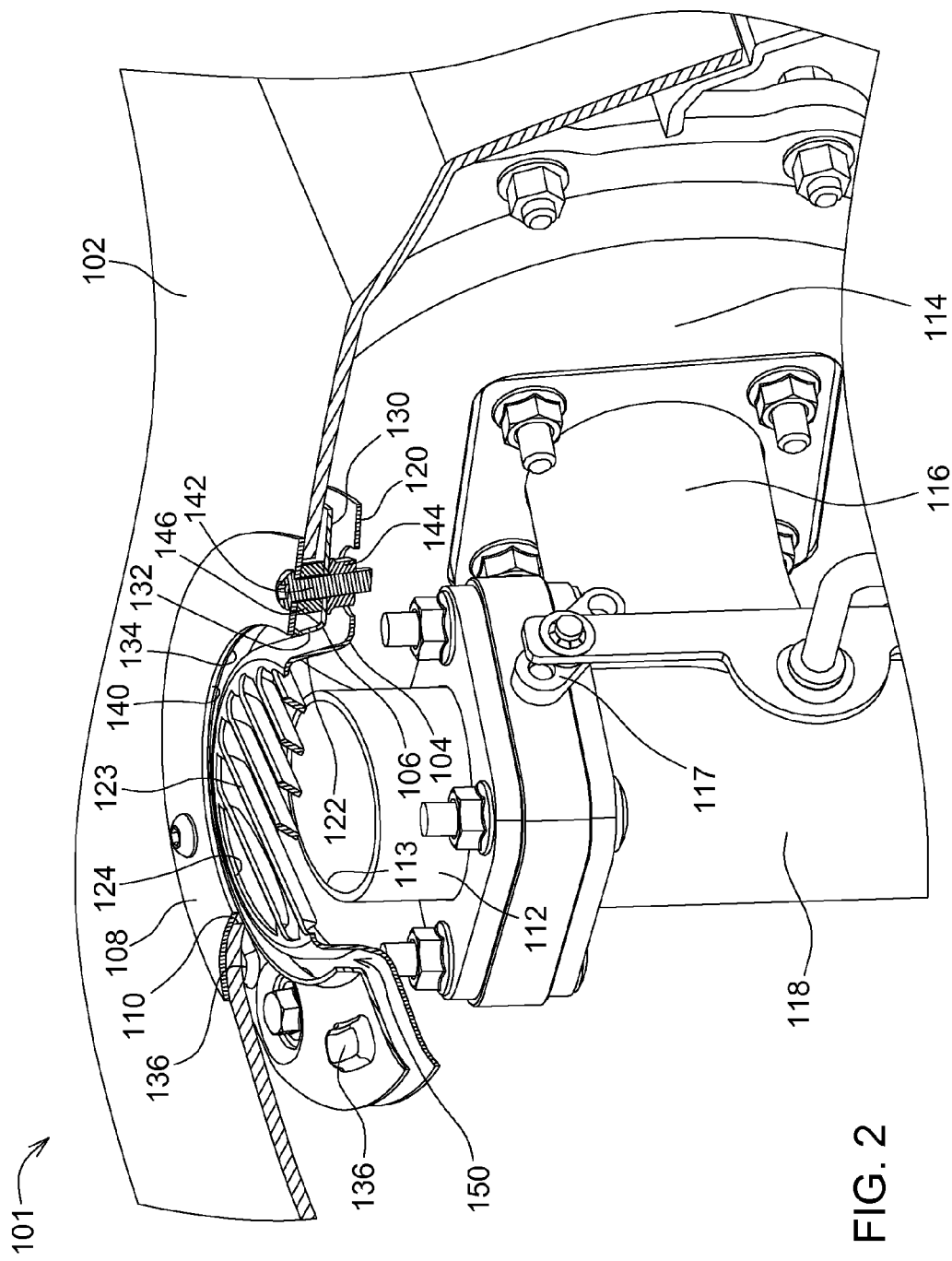
FIG. 2 is a perspective view, partially in section, of a flush mounted tractor exhaust outlet according to one embodiment of the invention.
Figure 3:
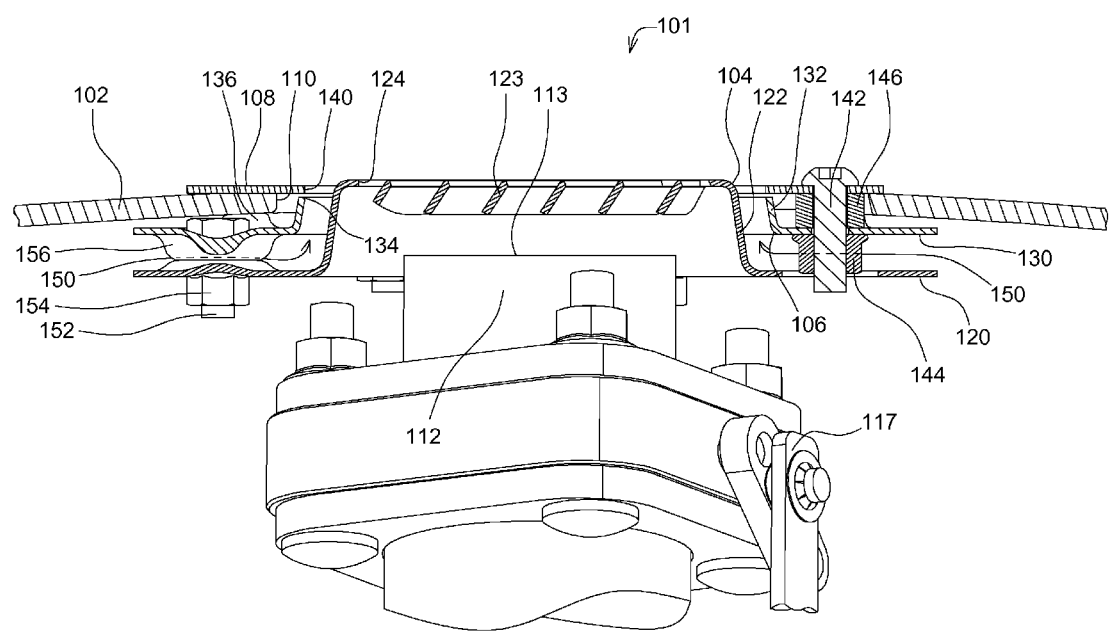
FIG. 3 is a side view in cross section of a flush mounted tractor exhaust outlet according to one embodiment of the invention.

In an embodiment of the invention shown in FIGS. 1-3, small and/or compact tractor 100 may be provided with flush mounted tractor exhaust outlet 101. The flush mounted tractor exhaust outlet may be provided through panel 102 of the tractor hood. Tractor hood panel 102 may be thermoplastic, painted metal or other composite material.

In one embodiment, flush mounted tractor exhaust outlet 101 may include outlet plate 104, support plate 106, and outlet ring 108. These components may be assembled together to provide a flush mounted tractor exhaust outlet through opening 110 in the tractor hood panel. The opening and outlet passage may be located above upwardly directed exhaust pipe 112 having a top or upper end 113 that terminates adjacent or just below the tractor hood panel. For example, the upwardly directed exhaust pipe may be connected to a tractor exhaust system that includes diesel particulate filter 114 having outlet 116. Optionally, the tractor exhaust system also may include one or more valves 117 to direct exhaust from an internal combustion engine either below the engine through downwardly directed exhaust pipe 118, or vertically above the engine through the upwardly directed exhaust pipe. The flush mounted tractor exhaust outlet also may be used with any other tractor exhaust system, including a tractor exhaust system having an upwardly directed exhaust pipe only and no diesel particulate filter.

In one embodiment, outlet plate 104 may be a one piece stainless steel plate having a thickness of between about 1 mm and about 2 mm. Outlet plate 104 may include flange 120 and neck 122 extending upwardly from the flange to central opening 124. The diameters of neck 122 and central opening 124 may be between about 100 mm and about 200 mm, or about 50% larger than the diameter of upwardly directed exhaust pipe 112. The neck may be tapered upwardly to a smaller diameter. The diameters of neck 122 and central opening 124 may be at least about 25% smaller than the diameter of opening 110 in the tractor hood panel. With the outlet plate secured to the tractor hood panel, flange 120 does not contact the tractor hood panel, but may be positioned at least about 10 mm below the bottom surface of the hood panel, and preferably below the top or upper end 113 of upwardly directed exhaust pipe 112. The top or upper end of the upwardly directed exhaust pipe may extend partially into neck 122. Additionally, louvers 123 or a screen may extend across the central opening of the outlet plate, to block debris from entering.

In one embodiment, support plate 106 may be a one piece zinc plated steel component having a thickness of between about 1 mm and about 2 mm. Support plate 106 may include flange 130 and neck 132 extending upwardly from the flange to central opening 134. Neck 132 may be shorter vertically than neck 122. The neck of the support plate may be radially outside the neck of the outlet plate. For example, the diameters of neck 132 and central opening 134 of the support plate may at least about 10% larger than the diameters of neck 122 and central opening 124 of the outlet plate. The diameters of neck 132 and central opening 134 also may be slightly smaller than the diameter of opening 110 in the tractor hood panel. The support plate may be positioned above the top or upper end 113 of upwardly directed exhaust pipe 112. The support plate may include a plurality of ribs or hollow projections 136 preferably having a surface area that is less than about 50% of the total surface area of flange 130. The ribs or hollow projections may contact and engage the underside of the tractor hood panel while the tractor hood panel is sandwiched between flange 130 of the support plate and outlet ring 108.

In one embodiment, outlet ring 108 may be a one piece stainless steel nickel plated plate having a thickness of between about 1 mm and about 2 mm. Outlet ring 108 may be a ring shaped member having central opening 140 that is the same or about the same size as central opening 134 of the support plate, and slightly smaller than the diameter of opening 110 in the tractor hood panel. Outlet ring 108 may be positioned on the top surface of the tractor hood panel so that it is flush or almost flush with the panel surface, or extends less than about 5 mm above the panel.

In one embodiment, the tractor hood panel may be sandwiched between outlet ring 108 and flange 130 of support plate 106. Thus, the flush mounted tractor exhaust outlet does not require threaded fasteners or holes for threaded fasteners to extend through tractor hood panel 104. Instead, threaded fasteners 142 may pass through holes in the support plate and outlet ring, secured with nuts 144 under the support plate. Additionally, spacers 146 may be provided between the support plate and outlet ring. Each spacer 146 may be about the same thickness as the tractor hood panel, and preferably between about 5 mm and about 20 mm in thickness. For example, the threaded fasteners may extend through spacers 146 positioned between support plate 106 and outlet ring 108. Ribs or hollow projections 136 on flange 130 of the support plate may contact the underside of the tractor hood panel. The ribs or hollow projections are preferably less than about 50% of the surface area of flange 130, so that most of the surface area of the support plate may be positioned and spaced below the underside of the tractor hood and does not come into contact with the tractor hood panel.

In one embodiment, the components of the flush mounted tractor exhaust outlet that are directly exposed to elevated temperature exhaust gasses do not contact the tractor hood panel. More specifically, outlet plate 104 may be secured to support plate 106 but does not contact the tractor hood panel. Additionally, air passage 150 may be provided between outlet plate 104 and support plate 106, to allow flow of hot air from the engine compartment. For example, air passage 150 may be provided between the flange 120 and/or neck 122 of outlet plate 104, and the flange 130 and/or neck 132 of support plate 106. A fan under the tractor hood panel may help direct air out though air passage 150 which may be at a lower temperature than exhaust gases in upwardly directed exhaust pipe 112.

In one embodiment, threaded fasteners 152 may extend through holes in outlet plate 104 and support plate 106, secured with nuts 154 under the outlet plate. Additionally, spacers 156 may be provided between the outlet plate and support plate. For example, each spacer 156 may be a dimple or offset in the support plate having a thickness of between about 5 mm and about 20 mm. Threaded fasteners 152 may extend through the spacers positioned between outlet plate 104 and support plate 106.

Having described a preferred embodiment, it will become apparent that various modifications can be made without departing from the scope of the invention as defined in the accompanying claims.

The invention claimed is:

1. A flush mounted tractor exhaust outlet, comprising:
an outlet plate having a flange and a neck extending upwardly to a central opening in a tractor hood panel without contacting the tractor hood panel;
a support plate having a flange and a neck extending upwardly radially outside the neck of the outlet plate and being attached to the outlet plate and having spacers between the outlet plate and the support plate to provide an air passage therebetween; and
an outlet ring having a central opening and positioned on the tractor hood panel and sandwiching the tractor hood panel between the support plate and the outlet ring;
an upwardly directed exhaust pipe having an upper end that terminates in the neck of the outlet plate without any portion of the exhaust pipe extending above the tractor hood panel.

2. The flush mounted tractor exhaust outlet of claim 1 further comprising a plurality of ribs on the support plate that contact the underside of the tractor hood panel while the tractor hood panel is sandwiched between the flange of the support plate and the outlet ring.

3. The flush mounted tractor exhaust outlet of claim 1 further comprising a plurality of threaded fasteners that extend through the spacers between the outlet plate and the support plate.

4. The flush mounted tractor exhaust outlet of claim 1 further comprising a plurality of spacers between the support plate and the outlet ring, and a plurality of threaded fasteners that extend through the spacers.

5. A flush mounted tractor exhaust outlet, comprising:
an outlet plate, a support plate and an outlet ring that are assembled together with a tractor hood panel sandwiched between the support plate and outlet ring; an upwardly directed exhaust pipe extending vertically up into the outlet plate where the exhaust pipe terminates without extending above the outlet plate, support plate or outlet ring; the outlet plate being spaced from the support plate, the outlet ring, and the tractor hood panel.

6. The flush mounted tractor exhaust outlet of claim 5 further comprising a passage between the outlet plate and support plate for outward flow of air at a lower temperature than exhaust gases from the upwardly directed exhaust pipe.

7. The flush mounted tractor exhaust outlet of claim 5 wherein the upwardly directed exhaust pipe is connected to a diesel particulate filter.

8. The flush mounted tractor exhaust outlet of claim 5 wherein the support plate has a flange with hollow projections contacting the tractor hood panel.

9. A flush mounted tractor exhaust outlet, comprising:
a plastic tractor hood panel sandwiched between an outlet ring and a support plate;
a plurality of spacers between the outlet ring and the support plate;
an air passage between the support plate and an outlet plate that does not contact the plastic tractor hood panel; and
a plurality of spacers between the support plate and the outlet plate;
an upwardly directed exhaust pipe extending vertically up into the outlet plate, wherein the upwardly directed exhaust pipe is completely below the tractor hood panel.

10. The flush mounted tractor exhaust outlet of claim 9 wherein the outlet plate includes a plurality of louvers.

* * * * *